(12) United States Patent
Layne et al.

(10) Patent No.: US 6,609,125 B1
(45) Date of Patent: Aug. 19, 2003

(54) FUNDS TRANSFER REPAIR SYSTEM

(75) Inventors: Mitchell Layne, North Bellmore, NY (US); David C. Kim, Iselin, NJ (US); Herb Stranzl, New York, NY (US); Felix Rubinchik, Brooklyn, NY (US); Clare Johannessen, Brooklyn, NY (US)

(73) Assignee: The Chase Manhattan Bank, New York, NY (US)

( * ) Notice: Subject to any disclaimer, the term of this patent is extended or adjusted under 35 U.S.C. 154(b) by 0 days.

(21) Appl. No.: 09/274,850

(22) Filed: Mar. 23, 1999

(51) Int. Cl.[7] .............................................. G06F 17/30
(52) U.S. Cl. ...................... 707/6; 707/2; 707/3; 707/4; 707/5; 707/10
(58) Field of Search .............................. 707/4, 5, 2, 3, 707/6, 10; 709/206, 6; 715/540, 526

(56) References Cited

U.S. PATENT DOCUMENTS

| | | | |
|---|---|---|---|
| 5,265,065 A | * 11/1993 | Turtle | 707/5 |
| 5,717,989 A | 2/1998 | Tozzoli et al. | |
| 5,724,571 A | * 3/1998 | Woods | 606/5 |
| 5,825,003 A | 10/1998 | Jennings et al. | |
| 5,884,033 A | * 3/1999 | Duvall et al. | 707/5 |
| 5,884,290 A | 3/1999 | Smorodinsky et al. | |
| 5,991,714 A | * 11/1999 | Shaner | 704/9 |
| 6,012,075 A | * 1/2000 | Fein et al. | 707/540 |
| 6,105,023 A | * 8/2000 | Callan | 707/5 |
| 6,125,391 A | * 9/2000 | Meltzer et al. | 709/223 |

* cited by examiner

Primary Examiner—Jean M. Corrielus
Assistant Examiner—Cam-Y Truong
(74) Attorney, Agent, or Firm—Dickstein, Shapiro, Morin & Oshinsky, LLP

(57) ABSTRACT

A method for processing an incoming electronic message containing raw data includes the steps of: providing a database having a plurality of stored records, each stored file having searchable data and output data; selecting at least a subset of the raw data from the incoming electronic message to produce search criteria; searching the database to locate a stored record having searchable data substantially matching the search criteria; and automatically replacing at least a subset of the raw data of the incoming electronic message with the output data associated with the located stored record.

16 Claims, 4 Drawing Sheets

FUNDS TRANSFER REPAIR SYSTEM

BACKGROUND OF THE INVENTION

1. Field of Invention

The present invention relates to a method and apparatus for processing an incoming electronic message to correct erroneous data within the message and, more particularly, the present invention is directed to searching a database for substantially similar previously received electronic messages and utilizing existing correction data to replace data of the electronic message.

2. Related Art

Businesses receive many electronic messages each day which must be processed in various ways prior to delivery to an intermediate or final destination. In particular, financial institutions receive incoming electronic messages throughout the day representing financial transactions, such as payments or deposits. Often, the incoming electronic messages are transmitted from a plurality of different entities, such as wire services (such as SWIFT), clearing houses (such as CHIPS), and/or the Federal Reserve Bank (FED). As well as other entities world wide. A large financial institution, such as Chase Manhattan Bank, may receive as many as 200,000 or more incoming electronic messages from these entities and others over the course of a day. Thus, in order to efficiently and quickly process the incoming electronic messages it is extremely important that the incoming electronic messages contain accurate data.

Permitting incoming electronic messages containing erroneous data to pass on to subsequent processes or entities without verifying the accuracy of data will often result in excess costs in terms of human resources, efficiency, revenue, and customer satisfaction.

Prior art methods for processing these incoming electronic messages, if any, require manual review and revisions to each incoming electronic message to obtain a high degree of confidence in the quality of the data. These methods, however, are disadvantageous in that they require significant human resources, and have relatively low throughput.

Accordingly, there is a need in the art for a novel method and apparatus for processing incoming electronic messages to identify and correct erroneous data.

SUMMARY OF THE INVENTION

In order to overcome the disadvantages of the prior art, a method for processing an incoming electronic message containing raw data according to the present invention includes the steps of: providing a database having a plurality of stored records, each stored record having searchable data and output data; selecting at least a subset of the raw data from the incoming electronic message to produce search criteria; searching the database to locate a stored record having searchable data substantially matching the search criteria; and automatically replacing at least a subset of the raw data of the incoming electronic message with the output data associated with the located stored record.

The step of generating the searchable data may include the steps of: providing an algorithm for converting raw data of the incoming electronic message into at least one index string; inputting at least the subset of the raw data into the algorithm; and assigning the searchable data to be the resulting index string.

The step of producing the search criteria may include the steps of: inputting at least a subset of raw data of a subsequent incoming electronic message into the algorithm; and assigning the search criteria to be the resulting index string.

The electronic messages may each have a plurality of fields containing the raw data.

The step of providing a database may include the steps of: determining whether at least one of the fields of an incoming electronic message contains erroneous raw data; determining correct data for replacing the erroneous raw data; creating a stored record comprising (i) unique searchable data generated from at least a subset of the raw data, and (ii) output data comprising the correct data; and storing the stored record in the database.

An apparatus for processing an incoming electronic message containing raw data according to the invention includes: a database having a plurality of stored records, each stored record having searchable data and output data; and a processing unit operable to (i) select at least a subset of the raw data from the incoming electronic message to produce search criteria; (ii) search the database to locate a stored record having searchable data substantially matching the search criteria; and (iii) automatically replace at least a subset of the raw data of the incoming electronic message with the output data associated with the located stored record.

Other objects, features, and/or advantages of the present invention will become apparent to those skilled in the art from the disclosure herein taken in conjunction with the accompanying drawing.

BRIEF DESCRIPTION OF THE DRAWING

For the purposes of illustrating the invention, the drawing includes forms which are presently preferred, it being understood, however, that the invention is not limited to the precise arrangements and/or instrumentalities shown.

DETAILED DESCRIPTION OF THE INVENTION

Figure 1:
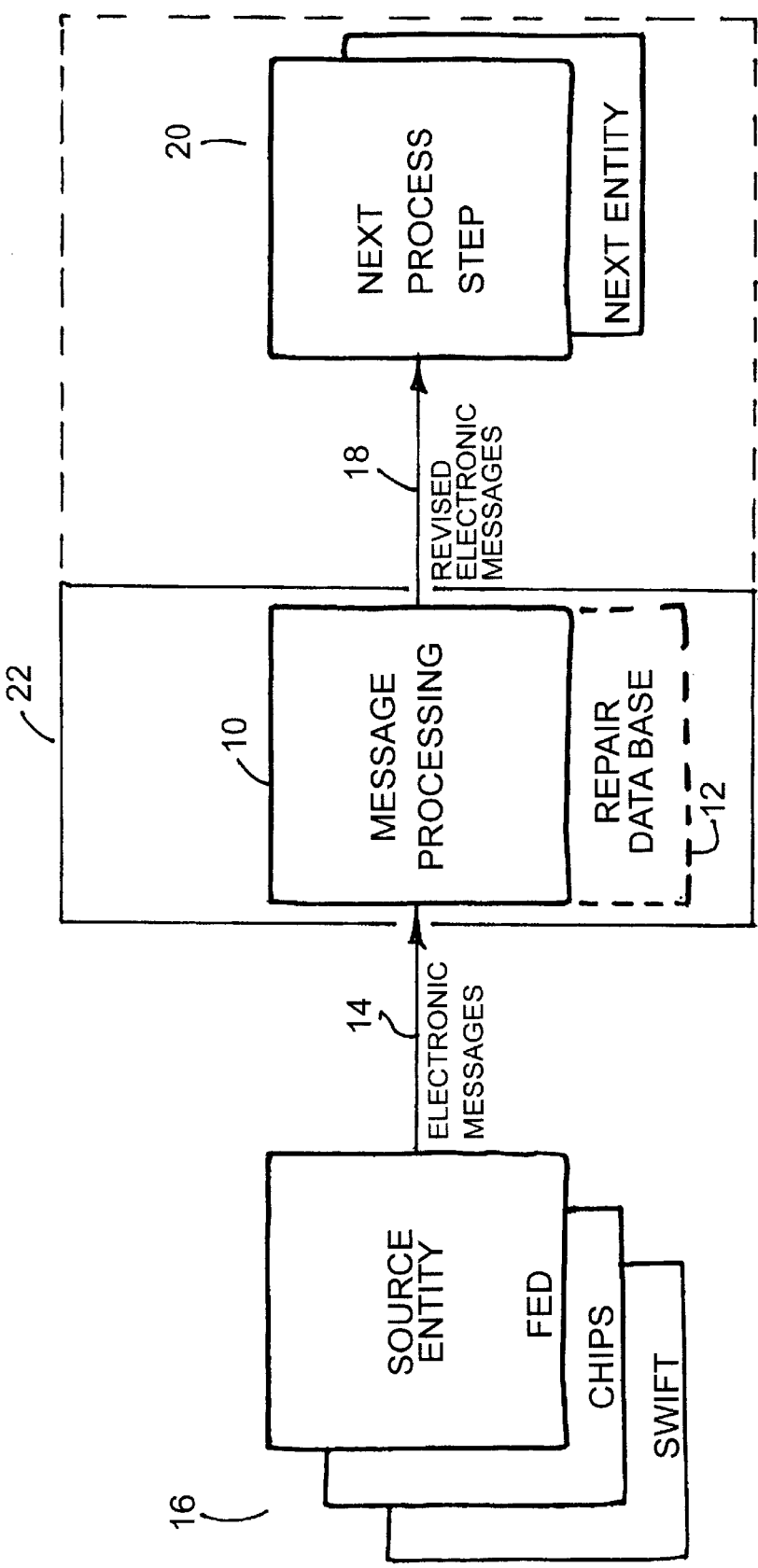
FIG. 1 is a block diagram illustrating the present invention and the environment in which it may be utilized.

Referring now to the drawing wherein like numerals indicate like elements, there is shown in FIG. 1 a block diagram illustrating the invention and an environment in which it is preferably utilized.

The present invention includes a message processing unit 10 in communication with a repair database 12. The message processing unit 10 may include a microprocessing unit (not shown), such as a personal computer or mainframe operating under the control of a suitable application software program. The message processing unit 10 may also include a database server (not shown), such as a multi-tasking computer or dedicated computer operating under a suitable application software program (such, as an Oracle program) which facilitates data transfer between portions of the message processing unit 10 and the repair database 12.

The message processing unit 10 receives a plurality of electronic messages over a transmission line 14 (or any type of communication channel) from one or more source entities 16. The message processing unit 10 may include a data server (not shown) capable of receiving the electronic messages over line 14 as is known in the art. After processing one or more electronic messages, the message processing unit 10 outputs revised electronic messages over line 18 (representing any type of communication channel) to a next entity or next processing step 20.

In the context of financial institutions, source entities 16 may include wire services (e.g., SWIFT), a clearing house (e.g., CHIPS), and/or any other financial institution, such as the FED. These types of financial institutions typically transmit electronic messages in the form of payment and/or deposit receipts to a bank 22 employing the message processing unit 10 of the present invention. The payment and/or deposit receipts contain raw data, such as account information, monetary amounts, crediting parties, account numbers, etc., as is known in the art. More particularly, incoming electronic messages of the payment and/or deposit receipt variety may also include at least one of the following types of raw data:
Note: Their may be other generic names added on the future. This should not be viewed as a complete lot.
  (1) identification of an originating entity,
  (2) identification of a financial institution of the originating entity,
  (3) identification of a financial account of the originating entity,
  (4) identification of a sending entity,
  (5) identification of a financial institution of the sending entity,
  (6) identification of a financial account of the sending entity,
  (7) identification of a debit entity,
  (8) identification of a financial institution of is the debit entity,
  (9) identification of a financial account of the debit entity,
  (10) identification of a credit entity,
  (11) identification of a financial institution of the credit entity,
  (12) identification of a financial account of the credit entity,
  (13) identification of an intermediate (account) entity,
  (14) identification of a financial institution of the intermediate (account) entity,
  (15) identification of a financial account of the intermediate (account) entity,
  (16) identification of an ultimate beneficiary entity,
  (17) identification of a financial institution of the ultimate beneficiary entity, and
  (18) identification of a financial account of the ultimate beneficiary entity.

Often, the raw data contained within an electronic message may include erroneous data, for example, it may include an incorrect identification number for a particular financial account. The erroneous data may be caused by many factors but is often due to chronic errors in automated systems within the source entities 16. For example, if a particular wire service has stored an incorrect account number for a particular person in its automated system, each time a payment and/or deposit receipt is generated for that account erroneous raw data as to that account number will be transmitted within respective electronic messages.

According to the present invention, the message processing unit 10 is operable to identify and correct erroneous data within the incoming electronic messages prior to transmission of revised electronic messages to the next entity or next process step 20.

Figure 2:
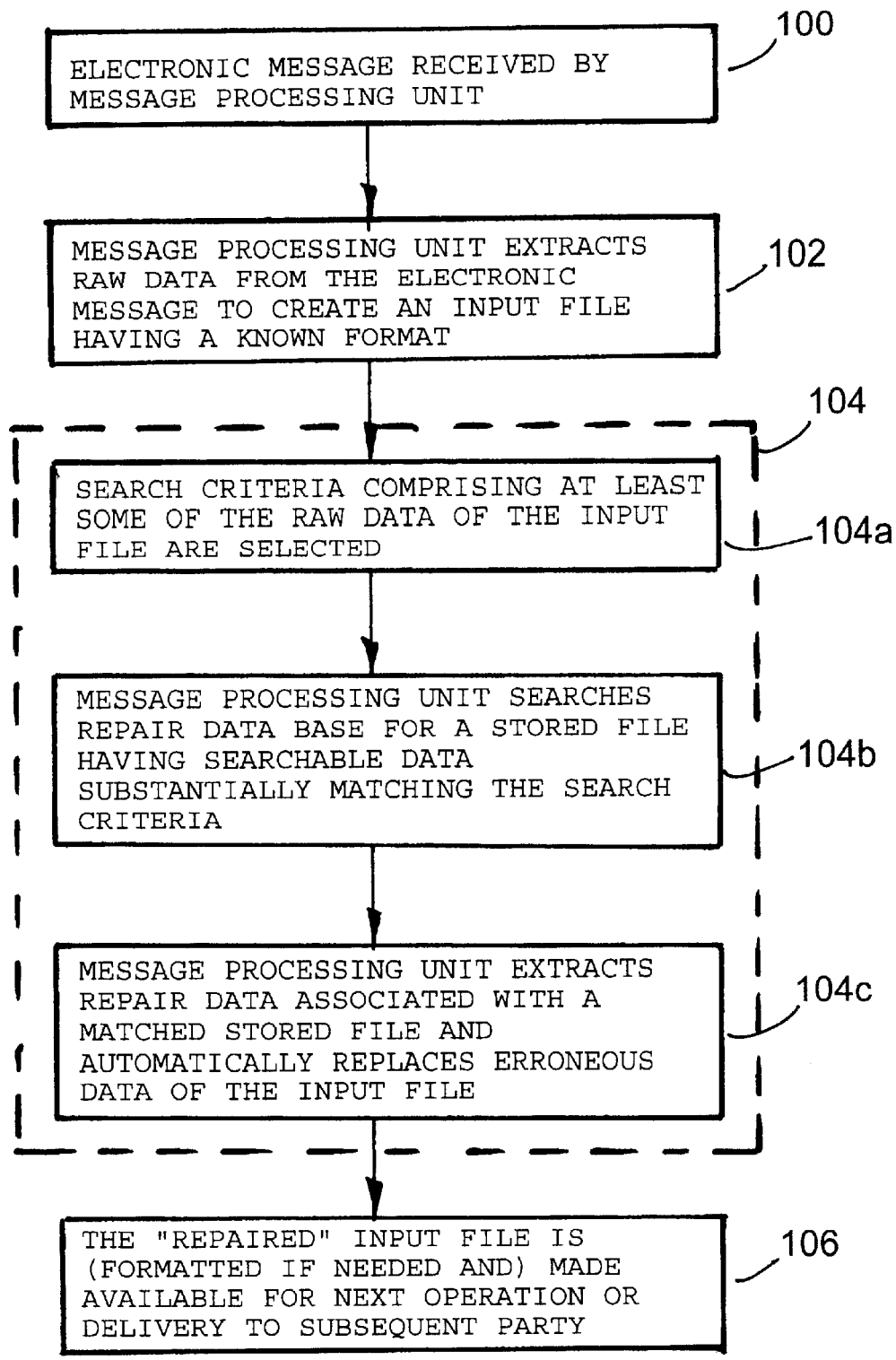
FIG. 2 is a flow diagram illustrating control steps to be carried out by the message processing unit of the present invention.

Reference is now made to FIG. 2 which is a flow diagram illustrating the control steps carried out by the message processing unit 10 according to the present invention. At step 100, the message processing unit 10 receives at least one incoming electronic message from a source entity 16. Those skilled in the art understand that the incoming electronic messages may be received individually or, more commonly, in batches.

The incoming electronic messages will often include a plurality of fields, each field containing a portion of raw data and the fields may be included among other data and arranged according to any of a plurality of different formats. For example, one field of an incoming electronic message may include raw data relating to the identification of an originating entity (i.e., an entity who handles the electronic message early in the overall process or generates the electronic message). Another field of the incoming message may contain raw data related to the identification of a financial institution or financial account number of the originating entity. Similarly, subsequent fields may contain other raw data related to monetary amounts, dates, other entities, other financial institutions, other financial accounts, etc.

At step 102 the message processing unit 10 extracts at least a subset of the raw data from an incoming electronic message from among the other data of the message to create an input record essentially containing a list of fields and corresponding raw data. Preferably, these fields and raw data are arranged according to a known format irrespective of the original format of the incoming electronic message.

Figure 4A:
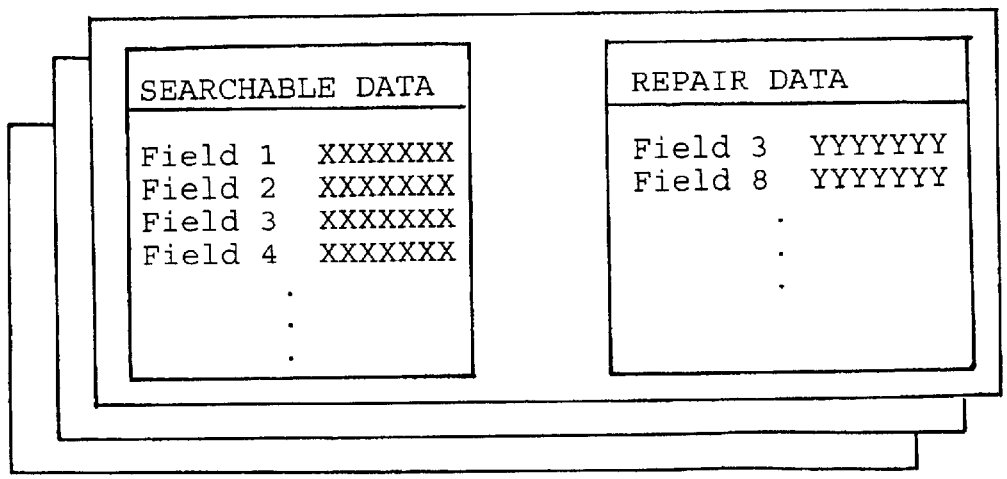
FIGS. 4a, 4b and 4c are block diagrams illustrating details of repair database of the invention shown in FIG. 1.

Among the steps carried out at 104, the message processing unit 10 accesses the repair database 12. With reference to FIG. 4a, the repair database 12 includes a plurality of stored records, each stored file including searchable data and output (or repair) data. Preferably, the searchable data is a function of the raw data, contained in one or more fields of a previously received electronic message. It is most preferred that the searchable data is unique and is not found in any other stored record within the repair database 12.

The repair data preferably includes revised (or corrected) data for one or more fields of an incoming electronic message. In particular, when a previously received electronic message is utilized to formulate the searchable data of a stored record, one or more fields of that electronic message may contain erroneous data which requires correction. The repair data for that stored file will include fields and corresponding revised data which should be substituted into the electronic message in place of the erroneous data.

Referring again to FIG. 2, at step 104a the message processing unit 10 establishes search criteria based upon at least some of the fields of the received electronic message. These search criteria are preferably formulated using a substantially similar procedure as was used to produce the searchable data of the stored records (FIG. 4a). Thus, at step 104b the message processing unit 10 searches the repair database 12 for a stored records having searchable data which substantially matches the search criteria of the received electronic message. At step 104c, the message processing unit 10 extracts the repair data from a matched stored record (if any) and automatically replaces the corresponding erroneous data of the received electronic message.

Therefore, assuming that the searchable data of the stored records is produced as a function of erroneous data contained in previously received electronic messages, a subsequently received electronic message containing the same or substantially similar erroneous data may be repaired by replacing the erroneous data with the repair data contained in the stored record.

At step 106, the repaired input record is made available for the next entity or next process step 18 in the process. Those skilled in the art will understand from the above teaching that the input record may require additional formatting to convert the known format of the input record to some other specified format suitable for the next entity or the next process step 18.

Those skilled in the art will understand that the ability of the message processing unit 10 to properly correct incoming electronic messages is a function of the number and quality of the stored files within the repair database 12. According to the invention, the repair database 12 may be revised from time to time or continually updated to ensure that unused stored record are eliminated, new stored record are produced and existing stored record are accurate.

Figure 3:
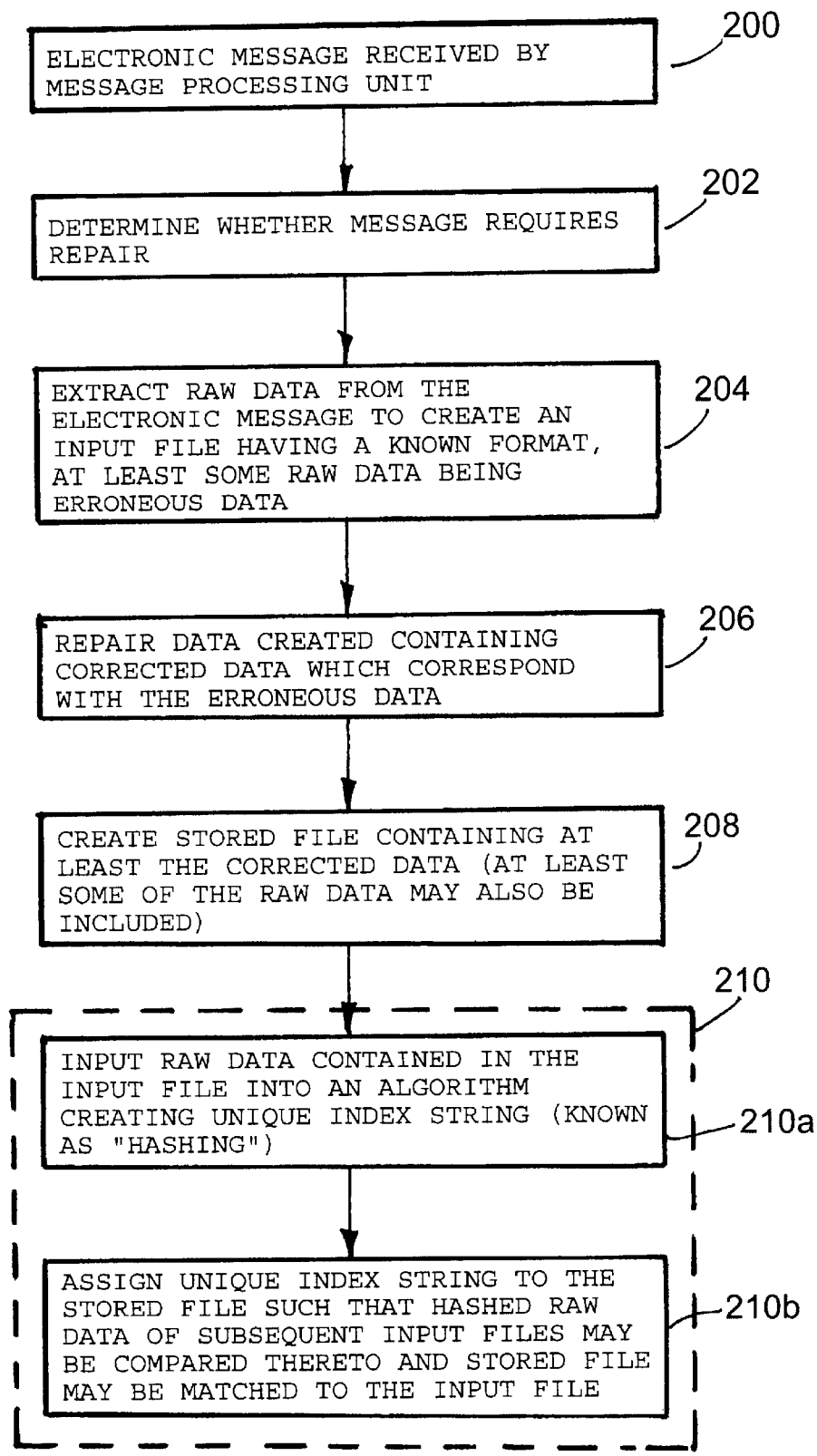
FIG. 3 is a flow diagram illustrating additional control steps according to the present invention.

Reference is now made to FIG. 3 which illustrates a flow diagram of the control steps employed by the message processing unit 10 of the present invention to revise the stored record within the repair database 12. At steps 200 and 202, an incoming electronic message is received by the message processing unit 10 and a determination is made as to whether the electronic message contains erroneous raw data. This determination may be made automatically using known algorithms (such as artificial intelligent programs, etc.) or may be made as a result of manual operations.

For example, assume an incoming electronic message containing erroneous raw data is received, the message processing unit 10 does not match a stored record with the electronic message, and the electronic message is subsequently treated as if it contained accurate raw data. Subsequently, it is discovered that that electronic message contained such erroneous data. A human operator and/or an automated process may accordingly determine that the electronic message contains erroneous data which requires repair.

At step 204, raw data of the electronic message are extracted to create an input record having the known format, where at least some of the raw data is erroneous data in need of repair. Next, repair data is created which contains revised (correct) data to replace the erroneous data of the received electronic message (step 206). At step 208, the repair data is used to create at least a portion of a stored record.

At step 210, searchable data is created as a function of at least some of the raw data (including the erroneous data) of the electronic message. Although the searchable data may simply be a list of the fields of the electronic message and corresponding raw data contained therein, it is preferred that indexing be utilized in order to increase the speed with which searches are carried out.

Figure 4B:
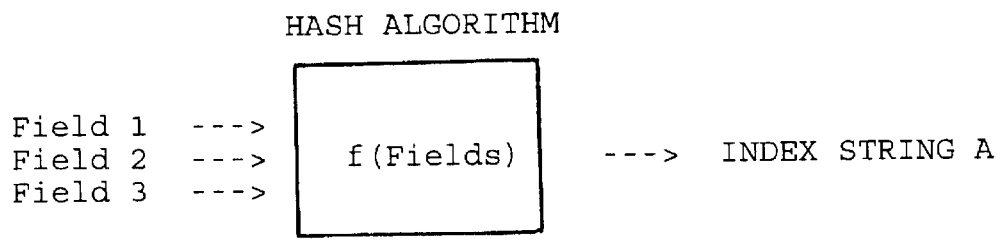
Figure 4C:
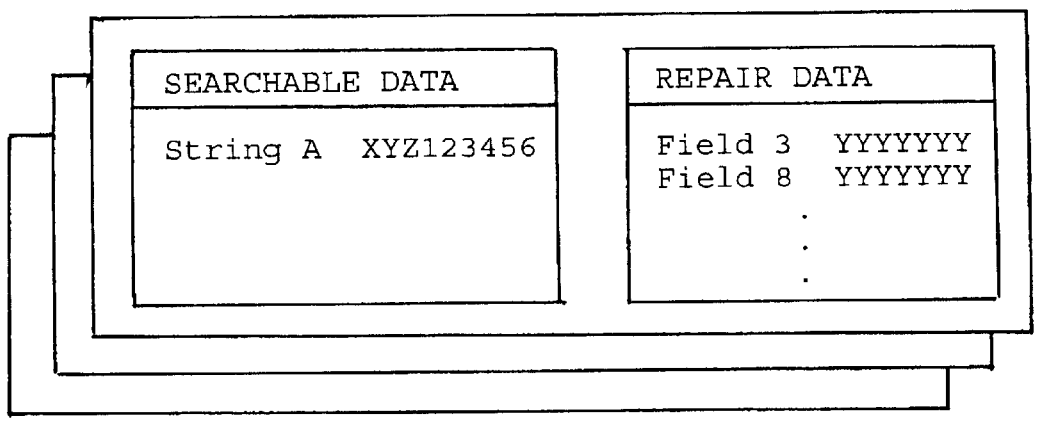

For example, with reference to steps 210*a*, 210*b*, and FIGS. 4*b*–4*c*, the raw data contained in the fields of the electronic message may be input into a so-called hashing algorithm to create a unique index string, such as a numeric and/or alpha numeric string. Suitable hashing algorithms which produce unique indexing strings as a function of raw input data are known to those skilled in the art. At step 210*b*, the unique index string is assigned to the stored file such that the string provides searchable data to locate the repair data (FIG. 4*c*).

A subsequently received incoming electronic message containing the same or substantially similar erroneous raw data may be input into the hashing algorithm to produce search criteria which would match the index string of the stored record.

Those skilled in the art from the above teaching will understand that the indexing algorithm may be augmented such that sets of stored record may be indexed to particular source entities 16. For example, the hashing algorithm may receive FED identification numbers, American Bank Association (ABA) numbers, Member Bank (MBR) numbers, Demand Deposit Account (DDA) numbers such that incoming electronic messages from particular source entities 16 may be matched only against certain sets of stored files. This ensures that source entities 16 employing substantially similar raw data for certain fields may be recognized and electronic messages received therefrom may be properly repaired.

Preferably, the message processing unit 10 of the present invention retains a count of the number of times that a particular stored record is matched with incoming messages. This provides a basis for removing stored record which are not accessed. Preferably, if a stored record has not been accessed within a predetermined period (for example, 30 calendar days), then the stored record is automatically purged from the repair database 12. The count also provides other statistical data, such as the frequency with which electronic messages are repaired which may then be utilized in producing revenues. Revenues may be obtained, for example, by charging source entities 16 an amount for each electronic message requiring repair.

The foregoing description of the preferred embodiments of the present invention have been provided for the purposes of illustration and description. They are not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A method for processing an incoming electronic message containing raw data, the method comprising the steps of:

providing a database having a plurality of stored records, each stored record having searchable data and output data;

determining whether a subset of the raw data of the incoming message contains erroneous data that cannot be processed;

if the subset contains erroneous data, selecting the subset to produce search criteria;

searching the database to locate a stored record having searchable data substantially matching the search criteria; and automatically replacing the subset of the raw data of the incoming electronic message with the output data associated with the located stored record.

2. The method of claim 1, wherein the step of providing a database includes the steps of:

determining correct data to replace the erroneous data;

creating a stored record comprising (i) searchable data generated from the subset of the raw data of the incoming electronic message, and (ii) output data comprising the correct data; and storing the stored record in the database.

3. The method of claim 2, wherein the step of generating the searchable data comprises the steps of:

providing an algorithm for converting raw data of the incoming electronic message into at least one index string;

inputting the subset of the raw data into the algorithm; and assigning the searchable data to be the resulting index string.

4. The method of claim 3, wherein the step of producing the search criteria includes the steps of:
inputting at least a subset of raw data of a subsequent incoming electronic message into the algorithm; and
assigning the search criteria to be the resulting index string.

5. A method for processing incoming electronic messages, each having a plurality of fields containing raw data, the method comprising the steps of:
providing a database having a plurality of stored records, each stored record having unique searchable data and output data;
determining whether a subset of the fields of the incoming message contains erroneous data that cannot be processed;
if the subset contains erroneous data, selecting the subset to produce search criteria;
searching the database to locate a stored record having searchable data substantially matching the search criteria; and
automatically replacing the raw data of the subset of the fields of the incoming electronic messages with the respective output data from the located stored record.

6. The method of claim 5, wherein the plurality of fields of each incoming electronic message is provided among other data and arranged according to a plurality of different formats, the method further comprising the step of extracting at least a subset of the fields from each incoming electronic message and arranging them in a common format.

7. The method of claim 5, wherein the step of providing a database includes the steps of:
determining correct data for replacing the erroneous data;
creating a stored file comprising (i) unique searchable data generated from the subset of the fields, and (ii) output data comprising the correct data; and
storing the stored record in the database.

8. The method of claim 7, wherein the step of generating the unique searchable data comprises the steps of:
providing an algorithm for converting the raw data into at least one index string;
inputting at least a subset of the raw data into the algorithm; and
assigning the unique searchable data to be the resulting index string.

9. The method of claim 8, wherein the step of producing the search criteria includes the steps of:
inputting at least a subset of fields of a subsequent incoming electronic message into the algorithm; and
assigning the search criteria to be the resulting index string.

10. The method of claim 5, wherein the incoming electronic messages represent financial documents transmitted from at least one entity to a financial institution.

11. The method of claim 10, wherein the incoming electronic messages represent at least one of payment and deposit transactions for at least one financial account.

12. The method of claim 11, wherein the plurality of fields of each incoming electronic message contain raw data representing at least one of:

identification of an originating entity,
identification of a financial institution of the originating entity,
identification of a financial account of the originating entity,
identification of a sending entity,
identification of a financial institution of the sending entity,
identification of a financial account of the sending entity,
identification of a debit entity,
identification of a financial institution of the debit entity,
identification of a financial account of the debit entity,
identification of a credit entity,
identification of a financial institution of the credit entity,
identification of a financial account of the credit entity,
identification of an intermediate (account) entity,
identification of a financial institution of the intermediate (account) entity,
identification of a financial account of the intermediate (account) entity,
identification of an ultimate beneficiary entity,
identification of a financial institution of the ultimate beneficiary entity, and
identification of a financial account of the ultimate beneficiary entity.

13. An apparatus for processing an incoming electronic message containing raw data, the apparatus comprising:
a database having a plurality of stored records, each stored record having searchable data and output data; and
a processing unit operable to (i) determine whether a subset of the raw data of the incoming message contains erroneous data that cannot be processed; (ii) select at least a subset of the raw data from the incoming electronic message to produce search criteria; (iii) search the database to locate a stored record having searchable data substantially matching the search criteria; and (iv) automatically replace the subset of the raw data of the incoming electronic message with the output data associated with the located stored record.

14. The apparatus of claim 13, wherein the processing unit is further operable to: (i) determine correct data to replace the erroneous data; and (ii) create a stored record comprising (a) searchable data generated from at least the subset of raw data of the incoming electronic message, and (b) output data comprising the correct data.

15. The apparatus of claim 14, wherein the processing unit includes an algorithm for converting raw data of the incoming electronic message into at least one index string, the processing unit being operable to input at least the subset of the raw data into the algorithm and assign the searchable data to be the resulting index string.

16. The method of claim 15, wherein the processing unit is operable to input at least a subset of raw data of a subsequent incoming electronic message into the algorithm and assign the search criteria to be the resulting index string.

* * * * *